United States Patent [19]

Gardner

[11] 4,138,517

[45] Feb. 6, 1979

[54] ARTICLE OF ORNAMENTED CLOTHING AND METHOD OF ORNAMENTING THE SAME

[76] Inventor: Michael C. Gardner, 7004 SW. 46th St., Miami, Fla. 33155

[21] Appl. No.: 891,528

[22] Filed: Mar. 30, 1978

[51] Int. Cl.$^2$ .................................................. B32B 3/02

[52] U.S. Cl. ...................................... 428/88; 156/306; 427/180; 427/200; 427/205; 427/206; 428/89; 428/90; 428/199; 428/206; 428/207; 428/208; 428/346; 428/913

[58] Field of Search ..................... 428/88, 89, 90, 199, 428/206, 207, 208, 346, 913; 427/180, 200, 205, 206; 156/306

[56] References Cited

U.S. PATENT DOCUMENTS

| | | | |
|---|---|---|---|
| 3,377,184 | 4/1968 | Kukoff | 428/90 |
| 3,806,397 | 4/1974 | Kukoff | 428/90 |

*Primary Examiner*—Marion E. McCamish
*Attorney, Agent, or Firm*—Kirschstein, Kirschstein, Ottinger & Corbin

[57] ABSTRACT

An ornamented article of clothing constituting a fabric substrate which forms at least a part of an article of clothing has applied to it in a pattern, with the aid of a stencil, an area of predetermined configuration such as a design, a character or a phrase in the form of an adhesive coating composed of a film-forming solid and a liquid solvent. The adhesive coating bonds to the substrate as by permeation into interstices thereof so that when the coating dries it will firmly adhere thereto. While the coating still is wet there are applied to the coating particles composed of a plastic material which is attackable by one or more constitutents of the still-wet adhesive, specifically the solvent or a plasticizer incorporated in the plastic solid. This attack on the surfaces of the particles causes the particles to bond to the adhesive coating. When the coating is dry as by evaporation of the solvent, there remains on the article a flexible film composed of residual constituents of the adhesive and superimposed thereon the particles which have become bonded to the adhesive coating. The flexibility of the coating prevents the thus-applied ornament from substantially stiffening and interfering with the flexibility of the underlying substrate. The substrate thus ornamented is machine-washable without impairment. Such treatment of the substrate will not lead to loss of any of the thus-bonded particles.

10 Claims, 4 Drawing Figures

FIG. 1
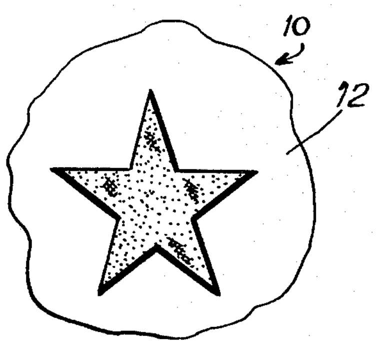
FIG. 2
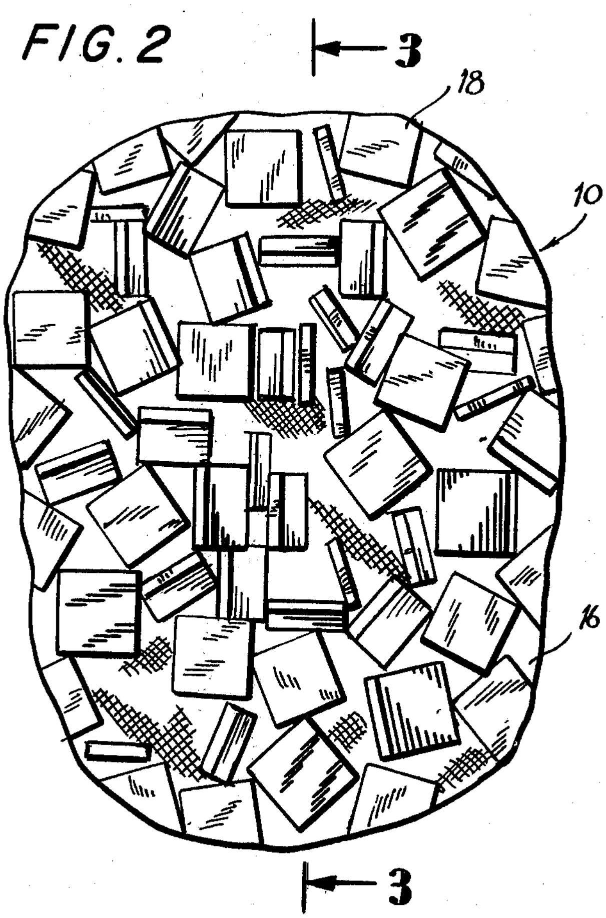
FIG. 3
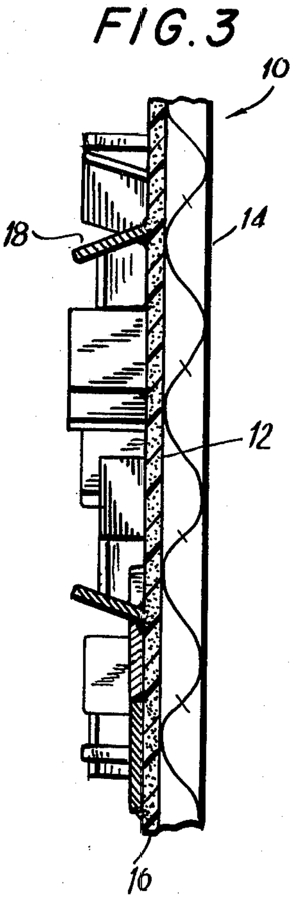
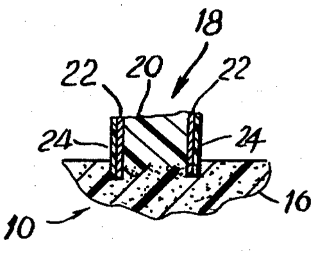
FIG. 4

ARTICLE OF ORNAMENTED CLOTHING AND METHOD OF ORNAMENTING THE SAME

BACKGROUND OF THE INVENTION

1. Field of the Invention

Flocked textiles and method of flocking the same.

2. Description of the Prior Art

It has been the practice heretofore to apply to fabric, particularly fabric panels which formed one or more parts of an item of clothing, an example thereof being T-shirts, different types of structures to form an ornamental design. According to one method, the structure applied was a heat-plasticizable transfer usually of thermoplastic material in one or more colors and forming a predetermined desirable pattern. The transfer was effected under heat and pressure, the thermoplastic material flowing sufficiently to enter into interstices of the fabric without disturbing the configuration or colors of the different parts of the plastic design.

Another method employed to form a design on fabric was first to apply to the fabric an adhesive material in liquid form, usually colorless, and in a configuration of a desired final design. Thereafter, flock would be deposited on the thus-applied adhesive while the adhesive still was wet and sticky. The term "flock" as used in the foregoing sense covers short lengths of vegetable and animal fibers, which is within the conventional meaning of the term "flock." However, in connection with fabric designs, the term "flock" as above used also has embraced inert particles of hard material of which sand, ceramics and metal are examples. These materials are inert in the sense that they exhibit no physical reactions to the adhesive. The adhesive between such particles, and these include fabric particles as well as inert particles, has been due solely to physical attraction between the adhesive coating and the particles. As a result, the bond, i.e. the adhesion, between the particles and the adhesive coating has been a surface-to-surface bond of low magnitude. It has been found that when articles thus ornamented are cleaned, either by dry cleaning in a solvent system which does not attack the set adhesive coating or when they are machine- or hand-washed at a consumer's home, the bond is not sufficiently strong to retain a great number of particles in place; rather, a considerable number of particles separate from the article so that after cleaning, whether it be dry cleaning or water cleaning, the design on the article no longer looks new and fresh — it becomes dull as a result of the ensuing sparsity of the particles.

The popularity of flocked ornamented articles therefore has been clouded by their short lives.

SUMMARY OF THE INVENTION

1. Purposes of the Invention

It is an object of the invention to provide an ornamented article which overcomes the forementioned drawbacks.

It is another object of the invention to provide an ornamented article and method of making the same wherein the ornamentation constitutes plastic particles which are secured to a fabric substrate by autogenous bonding, namely, a bonding such that the interfaces between the particles and the adhesive coating constitute zones wherein material of the particles and material of the adhesive are co-mingled.

It is another object of the invention to provide an article of the character described which is long-lasting, easy to produce on a mass scale and inexpensive.

It is another object of the invention to provide a method of the character described which can be carried out rapidly, efficiently and with comparatively unskilled operators.

Other objects of the invention in part will be obvious and in part will be pointed out hereinafter.

2. Brief Description of the Invention

An ornamented article according to the present invention includes a highly reflective surface that is completely machine-washable without any substantial reduction in its lustre and reflectivity. It is made by using particles of highly reflective material that are bonded to a fabric panel with an adhesive coating. The particles must be made of a plastic material which is attackable by a component of the plastic coating before the plastic coating has set. By "attackable" it is meant that the component of the plastic coating will soften by solvation a surface of the particle and the body of the particle a short distance beneath the surface. The purpose of this softening is to enable the wet plastic coating to penetrate a short distance into the particle without destroying the integrity of the particle. The actual distance of penetration of the component of the plastic coating into the particle is not critical. For example, a penetration of 0.0001" will be sufficient. A greater penetration, for example, in the order of 0.0005" is within the scope of the invention. During such penetration one or more solid components of the wet adhesive coating will intermingle with the solids of the particle and, finally, when the coating has set as by evaporation of a solvent, the comingled solids will form a firm autogenous bond between the then-dried coating and the particle. Such solid of the adhesive coating is a film-forming solid whereby the autogenous bond aforementioned will be a bond of solids.

The particles can be of random shape. The principal criterion is that the particles be of plastic which is attackable by the wet adhesive coating. However, as a practical matter, in the perferred form of the invention the particles are flat, that is to say, they have opposed parallel flat surfaces, and their thicknesses are small compared to any dimension of their flat surfaces. The particles conveniently can be made from flat stock by chopping the same into small pieces, this being a well-known technique. Moreover, preferably the particles are provided with reflective flat surfaces. A typical particle will constitute a small, thin, flat piece, the opposite surfaces of which are metallized, that is to say, coated with a layer of reflective metal such, for instance, as aluminum, the coating having been performed prior to the chopping of the stock. The metallized surface desirably is specular, or at least highly reflective and, to aid in maintaining this reflectivity over a period of time, the metallized surface is coated with a clear transparent protective film of plastic such, for instance, as a film of an epoxy resin. This protective film preferably is applied to the stock prior to the chopping thereof. Thus, a typical particle will constitute a core of a plastic material which is attackable by at least one component of a wet adhesive coating, the core being covered on both sides with a reflective layer such as a metal layer, and the metal layer being coated with a transparent protective layer of an epoxy resin. The edges of the particles are uncovered. Hence, the edges of the core likewise are uncovered and thereby exposed to the attack of at least a component of the wet adhesive coating which penetrates into the same as described above in order to form the desired ultimate autogenous bond of solids.

A typical particle is about 0.008" in its major dimension and, moreover, a typical particle is approximately square, that is to say, about 0.008" by 0.008". A typical thickness of a particle is 0.0015".

The adhesive coating typically constitutes a plastic material and a solvent for the same. The plastic material also usually will include a plasticizer, particularly if the plastic material is not normally flexible. Either the plasticizer or the solvent or both may constitute a component of the wet adhesive coating which will attack the plastic core of the reflective particles.

The plastic coating is applied to a fabric panel in a predetermined pattern which may be decorative or which may be used to convey a message as, for instance, a slogan or a word. The wet plastic material is applied in the desired pattern in any manner well known to the art including, for instance, silk screen printing, stencil printing, roller printing and stamp printing. The adhesive at this time is in the form of a liquid. It contains a film-forming solid and will, upon curing, assume the form of a flexible film which is adherent to the fabric substrate. The wet coating may penetrate into the fabric substrate to enhance its bond therewith. However, reliance may be placed solely on the adhesive property of the film to form a desired bond, and it is within the scope of the invention to employ flexible limp substrates of materials other than fabric, for example, plastic substrates or paper substrates.

After the adhesive coating has been applied in a predetermined pattern to the flexible limp substrate, and while the adhesive coating still is wet, in other words, still has not set as by curing or evaporation into a flexible solid film, the particles are applied to the still-wet adhesive coating. The application of the particles can be effected in any desired manner. For example, the particles can be blown onto the still-wet adhesive coating in a stream of cool air, or a mass of particles can be cascaded across the portion of the substrate with the patterned adhesive coating thereon, or the substrate can be pulled through a mass of such particles. Thereafter, the extraneous particles, which is to say, the particles that will not remain in place on the wet adhesive pattern, are removed as by shaking off, or by inverting the substrate, or by blowing a stream of air across the substrate. Next, preferably the substrate with the particles now at least temporarily secured to the adhesive coating is pressurized, for example, by pressing the same, inclusive of the particles, between a pair of platens, or by passing the substrate with particles thereon between the nip of a pair of rollers, the one engaging the particles preferably being elastomeric. This pressure ensures impregnation of the adhesive coating which still is wet into the fabric substrate and also ensures embedment of the particles into the adhesive coating. Mostly the particles are not totally embedded in the coating. Rather, most of the particles are only partially embedded in the coating, that is to say, portions of the particles are embedded in the coating. The portions of the particles which touch the coating have the plastic cores of the particles attacked by at least a component of the still-wet adhesive coating. This attack causes the edge surfaces of the cores to be solvated and allows the solids of the adhesive coating to co-mingle with the solids of the particles where the same are solvated. Hence, when ultimately the adhesive coating solidifies as by curing or volatilization of solvents, a bond of solids will be formed between each particle and the now-solid film of the adhesive coating. This bond is a very strong one and tends to securely retain the particles on the surface of the fabric substrate. The bond is far more secure than the bond hitherto formed between non-solvatable particles and an adhesive coating.

The time required for setting, i.e. solidifying, the wet adhesive coating will vary depending upon the particular make-up of the liquid adhesive coating and the ambient conditions. Typically, the solidifying of the adhesive is performed in the air at room temperature and takes about 12 to 24 hours. This can be speeded up, if desired, by moving the ambient air over the ornamented surface of the fabric surface or by raising the temperature of the ambient air to about, for example, 85° F.

After the adhesive coating has been set, surplus particles which are only lightly bonded or not at all bonded to the fabric substrate can be removed as, for instance, by brushing, either manually or with a machine, or shaking the ornamented substrate, or by washing the ornamented substrate followed by tumble drying. It will be found that an ornamented article thus prepared will, after being placed in the hands of a consumer, retain its freshness through many washing cycles, whether they be machine washing or hand washing.

The invention consists in the combination of elements and series of steps which will be exemplified in the article and method hereinafter described and of which the scope of application will be indicated in the appended claims.

BRIEF DESCRIPTION OF THE DRAWINGS

In the accompanying drawings in which is shown one of the various possible embodiments of the invention:

FIG. 1 is a plan view of a fragment of a fabric panel bearing an ornament embodying and made in accordance with the present invention;

FIG. 2 is an enlarged view of a fragment of the panel shown in FIG. 1;

FIG. 3 is a fragmentary sectional view taken substantially along the line 3—3 of FIG. 2; and FIG. 4 is a greatly enlarged fragmentary view showing the bond between a particle and an adhesive coating.

PREFERRED EMBODIMENT OF THE INVENTION

Referring now in detail to the drawings, the reference numeral 10 denotes a fabric panel which is all or part of an article of wearing apparel as, for example, the front of a T-shirt, this being an item of clothing which conventionally is provided, usually on its front, with some type of decoration either in the form of an ornament or a word or a slogan. In the preferred form of the invention the panel 10 is a fabric panel. For example, it is either woven or knitted material. The panel has a front face 12 and a rear face 14.

The front face of the panel is, pursuant to the present invention, provided with an adhesive coating 16 in a predetermined pattern. The pattern shown in FIG. 1 is in the shape of a star. Any other desired configuration may be employed, for instance, an outline of a thing, e.g. a tree, or a representation of a person or face, or of a fictional or real animal, or it may be a word or words such, for instance, as "PEACE."

The patterned adhesive coating can be applied by any well-known step. One method of application can be brushing on the pattern by hand. Another can be applying the pattern through a cut-out stencil, or, alternately, the pattern can be applied with the aid of a silk screen stencil. Further methods of application are roller printing or flatbed printing. Regardless of the method, the ultimate pattern will constitute an adhesive coating in some preselected configuration which is the configuration of the desired ultimate design. The adhesive material thus applied is in liquid form and will be wet at and immediately after its application to the panel 10.

A typical adhesive is an alkyd resin together with a plasticizer for the same, all dissolved in a solvent. A typical plasticizer for an alkyd resin is Nazdar-500 series, which is a G-60 Paraplex, this being a soya bean epoxide. A typical carrier for the resin is mineral spirits mixed with Solox which is denatured ethyl alcohol. It should be understood that the particular liquid adhesive material mentioned is merely typical. Generally speaking, the adhesive material constitutes a film-forming plastic or plastics, these being plastics that, after being applied in liquid form along with a solvent, upon evaporation, will leave a solid coherent film. The adhesive, while liquid, will penetrate into interstices of the fabric and, upon drying, will be so intimately bound up in the fabric as to become essentially a part thereof and firmly secured thereto. At least one component of the liquid adhesive is such that, as has been mentioned earlier, it will attack to solvate the surface of a plastic particle subsequently to be placed thereon, so that the solvent will mutually have dissolved therein at the surface of the particle a solid solvated part of the adhesive and a solid solvated part of the particle. The solvating portion of the liquid adhesive should be chosen so that it will not deeply attack the particle. The solvation of the particle should be only on the surface and a short distance beneath the surface so that the integrity of the particle is not noticeably deteriorated.

While the patterned adhesive coating still is wet, particles 18 are applied to the panel 10 so as to completely cover not only the pattern but portions of the panel around the panel solely to ensure that all of the pattern is in contact with the particles. The particles can be applied in any manner desired. For example, particles simply can be thrown on the panel in such a fashion as to completely cover the adhesive pattern. Alternate methods of application are blowing the particles up against the panel, at least over the adhesive pattern thereon, or cascading particles (for instance rolling particles) across the surface of the panel including the patterned adhesive coating. If desired, the panel with the adhesive coating thereon can be pulled through a body of the particles.

Regardless of the method employed, which may be any of the foregoing, particles will contact the entire exposed surface of the still-wet patterned adhesive coating so that essentially every part of the adhesive coating will have particles clinging thereto. The particles will be in random orientation. Some may be perpendicular to the panel 10, others may be flat against it. Still others will have sicdes adhering to the adhesive coating at different angles. Some of the particles may have one edge flat against the adhesive coating. Other particles may have corners adhering to the adhesive coating. The arrangement of the particles is wholly indiscriminate and unpredictable.

As observed previously, the particles are made of a plastic which is attackable by at least one component of the adhesive material in the adhesive coating while the latter still is wet, i.e. not solidified. The particles can be of any three-dimensional configuration. Nevertheless, in the preferred form of the invention the particles are flat as illustrated in the various figures; that is to say, the particles have opposed flat surfaces which are mutually parallel and are separated from one another by only a small distance so that the particles essentially are thin discs or flakes.

The specific chemical constitution of the particles is not critical as long as it is such that, as indicated above, the plastic is attackable by at least a component of the still-wet adhesive coating. By way of example, the particles may be composed of Mylar, a polyethylene terephthalate. Another combination of plastic and adhesive coating which may be mentioned by way of example is cellulose acetate for the plastic and a mixture of cellulose acetate and acetone for the adhesive.

Inasmuch as in the preferred form of the invention the ornamented area preferably is glittery, i.e. sparkling, the individual particles are highly reflective. This is accomplished by making each particle in the form of a flake having a central core 20, each opposite face of which (see FIG. 4) has a layer 22 of a reflective material such, for example, as aluminum. The exposed face of the aluminum layer is specular, i.e. shiny. To protect said exposed face, the same is covered with a layer 24 of a transparent plastic, e.g. an epoxy resin. An epoxy is used in preference to a resin such, for instance, as cellulose acetate because an epoxy is considerably harder and more durable.

A convenient way of forming the particles 18 is to provide strip stock of the core plastic and to coat opposite sides thereof with a laminated reflective layer which, in turn, is coated with a protective layer. Thereafter, the stock is chopped up, as is well known in the manufacture of glitter, to form the tiny particles 18. With the conventional method used for chopping, the particles are polygonal, usually being rectangular as shown in FIG. 2. Due to this method of formation the flat faces of the particles constitute epoxy protected reflective surfaces covering the central core, but the edges of the core are exposed so that the plastic material of the core will, when the particles are deposited on the wet adhesive coating, be contacted by said coating and the exposed surfaces will be wetted and attacked by the adhesive coating. During this attack the adhesive coating will solvate the edges of the core to a slight extent whereby to form at said edges a mixture of the solvated solids of the adhesive coating and the core in a matrix of the solvated material of the adhesive coating. Thereafter, when the adhesive coating sets, as by curing or evaporation of solvents, there will be a mixture of said solids where the particles are in contact with the adhesive coating. This mixture will form an excellent secure bond between the individual particles and the now-dried adhesive coating.

After the particles 18 have been deposited on the patterned adhesive coating and while the adhesive coating still is wet, the unwanted extraneous particles, i.e. those not in contact with the adhesive coating and which may tend to remain attached thereby to virtue of coherent forces and/or electrostatic forces, preferably are removed. This may be done by shaking said extraneous particles off the panel, or by inverting the panel, or by blowing a stream of air across the panel.

The next step is optional and is to ensure the penetration of the liquid adhesive coating layer into the fabric and the embedment of particles into said coating. This step is to apply pressure against the particles. It can be done by compressing the panel and particles between a pair of platens or by passing the panel and particles between the nip of a pair of rollers. Desirably, the roller in contact with the particles is rubbery.

The application of pressure does not flatten the particles and cause them all to lie parallel to the upper surface 12 of the panel.

The solvating portion of the liquid adhesive coating penetrates the edge surfaces of the particles as described above and, upon hardening of the adhesive coating, forms the excellent desired bond such as mentioned. The period of hardening will vary with a change in ambient surroundings. It has been found that typically about 12 to 24 hours is sufficient to ensure setting of the adhesive coating and excellent bonding of the particles thereto. This period can be shortened by having the ambient air circulated or by raising the temperature of the ambient air, e.g. to 80° to 100° F.

FIG. 4 illustrates the nature of the bond between the core of a particle and the adhesive coating. It will be observed that the adhesive coating which here is shown as set, i.e. solid, has a portion penetrating into the skin and slightly beneath the skin of the core. Due to this penetration there is a mixture of the solids of the core and the solids of the adhesive coating. This mixture dries as a mixture and thereby forms an autogenous joint between the coating and the core of the particle.

After the coating has dried, the particles are firmly in place and, desirably, the particles which are not thus firmly secured are removed as by brushing the same either manually or with a machine and/or by shaking the printed panel. Finally, the panel, which by now may have been incorporated into an article of clothing, has loose particles removed by washing the article in a machine such as a commercial washer, followed by tumble drying.

It thus will be seen that there are provided an article and method which achieve the various objects of the invention and which are well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A decorative, cleanable fabric article, particularly an ornamented article of clothing, comprising:

(a) a limp flexible fabric panel;

(b) a film-forming adhesive coating applied to the fabric panel in a predetermined pattern, said coating having a solid plastic component and an evaporable liquid solvent component; and (c) a mass of light-reflective particles randomly applied over the patterned coating, each particle having a generally flattened core of plastic material which is attackable by the solvent component and which has opposite major surfaces, and a light-reflective layer only on each major surface to thereby leave the respectively remaining border edge region uncoated and exposed to attack by the solvent component, each border edge region being softened by solvation after contact has been made with the solvent and being slightly penetrated without substantially destroying the structural integrity of the respective particle, to thereby intermingle the solid plastic component of the coating with each plastic particle in contact therewith, and each particle forming a solid reinforced autogenous joint between the coating and each particle in intermingled relationship therewith after evaporation of the solvent component, the opposite sides of each autogenous joint being flanked by the light-reflective layers which thereby strengthen the respective joint and securely retain the particles on the article, particularly during cleaning of the same.

2. The article as defined in claim 1, wherein each light-reflective layer is a metallized layer having a specular finish.

3. The article as defined in claim 1; and further comprising a protective layer of a transparent plastic over each light-reflective layer.

4. The article as defined in claim 1, wherein each particle is flat and thin.

5. A method of making a decorative, cleanable fabric article, particularly an ornamented article of clothing, comprising the steps of:

(a) applying to a limp flexible fabric panel in a predetermined pattern a film-forming adhesive coating which includes a solid plastic component and an evaporable liquid solvent component;

(b) forming a mass of particles of plastic material which is attackable by the solvent component, each plastic particle having opposite major surfaces;

(c) coating only the opposite major surfaces of each plastic particle with a light-reflective layer, and leaving the respectively remaining border edge region uncoated and exposed to attack by the solvent component;

(d) randomly applying the surface-coated particles to the panel over the patterned coating, and thereby placing the border edge regions of the respective particles into contact with the coating, the solvent component of the latter softening by solvation at the respective border edge regions and penetrating slightly within the particles without substantially destroying the structural integrity of the particles to thereby intermingle the solid plastic component of the coating with each plastic particle in contact with the coating; and (e) forming a solid reinforced autogenous joint between the coating and each particle in intermingled relationship therewith by evaporating the solvent component, the light-reflective layers flanking opposite sides of each autogenous joint to thereby strengthen the latter and securely retain the particles on the article particularly during cleaning of the same.

6. The method as defined in claim 5, wherein the step of coating each particle includes applying to the major surfaces of the latter a metallized layer having a specular finish.

7. The method as defined in claim 5; and further comprising the step of covering the light-reflective layers on each particle with a layer of a transparent plastic.

8. The method as defined in claim 5; and further comprising the step of applying pressure against the particles.

9. The method as defined in claim 5, wherein the step of softening the border edge regions by solvation is performed at room temperatures.

10. The method as defined in claim 5, wherein the step of forming the particles includes forming the latter as flat, thin flakes.

* * * * *